Aug. 10, 1965 R. R. LUCKENBACH ETAL 3,200,345
SELECTIVE VARIABLE GAIN AND BANDWIDTH AMPLIFIER
Filed Sept. 17, 1962
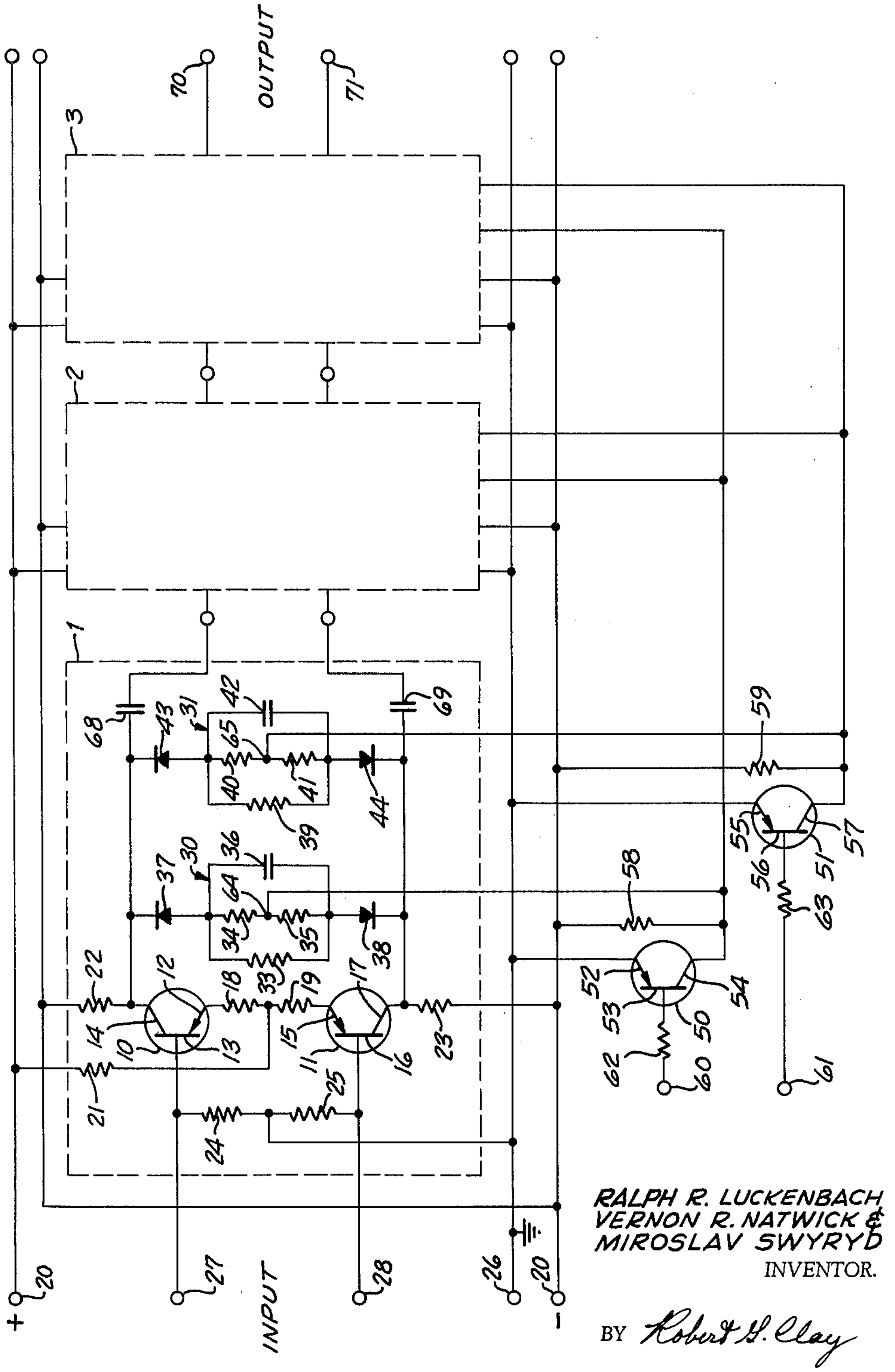
RALPH R. LUCKENBACH
VERNON R. NATWICK &
MIROSLAV SWYRYD
INVENTOR.
BY Robert G. Clay
ATTORNEY United States Patent Office 3,200,345

Patented Aug. 10, 1965

3,200,345
SELECTIVE VARIABLE GAIN AND BANDWIDTH AMPLIFIER

Ralph R. Luckenbach, Menlo Park, Vernon R. Natwick, Saratoga, and Miroslav Swyryd, Palo Alto, Calif., assignors to Ampex Corporation, Redwood, Calif., a corporation of California Filed Sept. 17, 1962, Ser. No. 223,916
3 Claims. (Cl. 330—29)

This invention relates to an amplifier, and more particularly to a selectable gain and bandwidth amplifier whose gain and bandwidth are controlled by an electronic switching circuit.

In magnetic tape recording and playback systems used in instrumentation and computer apparatus, it is advantageous in certain applications to vary the speed of a magnetic tape during the playback mode. However, when the speed of the magnetic tape is varied, it is necessary to change the gain and bandwidth of a playback amplifier for optimizing signal-to-noise ratio. Heretofore, relay circuits have been used to select one of several gain and bandwidth determining networks in the output circuit of the playback amplifier. Relay type circuits have certain disadvantages and drawbacks, such as complexity, high cost, large power consumption and shock and vibration limitations.

It is an object of this invention to provide a selectable gain and bandwidth amplifier whose gain and bandwidth are controlled by an electronic switching circuit.

It is another object of this invention to provide a selectable gain and bandwidth amplifier that utilizes a simple and inexpensive electronic switching circuit to control the gain and bandwidth of the amplifier.

It is a further object of this invention to provide a selectable gain and bandwidth amplifier circuit for use in a magnetic tape recording and playback system.

Other objects and advantages of this invention will be apparent from the following detailed description of a preferred embodiment of the invention when taken with the drawing which shows in the sole figure a schematic diagram of the preferred embodiment of the invention.

Briefly, the present invention utilizes an electronic switching circuit comprised of two transistors and four diodes for selecting one of two gain and bandwidth determining networks in the output circuit of an amplifier. The two switching transistors control the conductivity of the four switching diodes, thereby causing one of the two gain and bandwidth determining networks to become operative. The components of the selected network determine the gain and bandwidth of the amplifier by controlling the A.C. load impedance of the output circuit. Thus, the present invention provides a variable gain and bandwidth amplifier that utilizes a simple and inexpensive switching circuit for selecting an appropriate gain and bandwidth determining network.

Referring to the sole figure, there is shown a variable gain and bandwidth amplifier circuit for use during the playback mode of a magnetic tape recording and playback system. The amplifier circuit is comprised of three amplifying stages which are indicated by blocks having reference numerals 1, 2 and 3. Since each of the amplifying stages 1, 2 and 3 have identical components, only the components of stage 1 are shown. Stage 1 of the amplifier circuit is comprised of a pair of PNP transistors 10 and 11, each having the usual emitter, base and collector electrodes, which are indicated by reference numerals 12, 13 and 14, respectively, for transistor 10 and reference numerals 15, 16 and 17, respectively, for transistor 11. The emitter electrodes 12 and 15 of transistors 10 and 11 are coupled together through resistors 18 and 19. The common terminal between the emitter resistors 18 and 19 is coupled to the positive terminal of power supply 20 through resistor 21. Thus, the transistors 10 and 11 are arranged as a symmetrical common-emitter amplifier which is differentially balanced by the resistor 21. The collector electrode 14 of transistor 10 is coupled to the negative terminal of power supply 20 through resistor 22 while the collector electrode 17 of transistor 11 is coupled to the negative terminal of power supply 20 through resistor 23. The base electrode 13 and 16 of transistors 10 and 11 are coupled together through input resistors 24 and 25, and the common terminal between the resistors 24 and 25 is connected to ground terminal 26. Information to be amplified is differentially applied to input terminals 27 and 28 across ground terminal 26, and then appears at the base electrodes 13 and 16 of transistors 10 and 11.

The output of the common-emitter amplifier 10, 11 of stage 1 is developed across a collector load impedance consisting of the resistors 22 and 23 in parallel with two gain and bandwidth determining networks 30 and 31. The two networks 30 and 31 enable the gain and bandwidth of the amplifier 10, 11 to be varied for two different speeds of a magnetic tape. The gain and bandwidth determining network 30 is comprised of resistor 33, series resistors 34 and 35 and a capacitor 36 connected in a parallel configuration. One end of the gain and bandwidth determining network 30 is coupled to the collector electrode 14 of transistor 10 through switching diode 37 while the other end is coupled to the collector electrode 17 of transistor 11 through switching diode 38. The values of components 33, 34, 35 and 36 of network 30 determine the gain and frequency response of the amplifier 10, 11 by controlling the A.C. load impedance of the collector circuit. Network 30 is operative when the magnetic tape is traveling at a low speed, for example. Gain and bandwidth determining network 31 is comprised of resistors 39, 40 and 41 and capacitor 42 connected in an identical parallel configuration as network 30. One end of the gain and bandwidth determining network 31 is coupled to the collector electrode 14 of transistor 10 through switching diode 43 while the other end is coupled to the collector electrode 17 of transistor 11 through switching diode 44. The values of components 39, 40, 41 and 42 of network 31 determine the gain and frequency response of the amplifier 10, 11 when the magnetic tape is traveling at a high speed, for example. Thus, the two networks 30 and 31 coupled to the output circuit of the common-emitter amplifier 10, 11 enables the gain and bandwidth of the amplifier to be varied for two different speeds of the magnetic tape. Variable resistors may be employed in place of fixed resistors 33 and 39 in gain and bandwidth networks 30 and 31, and may be adjusted to compensate for variations in amplifier gain.

In accordance with the present invention, there is provided a pair of PNP switching transistors 50 and 51 for controlling the conductivity of the four switching diodes 37, 38, 43 and 44. Switching transistor 50 consists of an emitter electrode 52, a base electrode 53 and a collector electrode 54 while switching transistor 51 consists of an emitter electrode 55, a base electrode 56 and a collector electrode 57. The emitter electrodes 52 and 55 of transistors 50 and 51 are connected to the ground terminal 26, and the collector electrodes 54 and 57 are coupled to the negative terminal of the power supply 20 through load resistors 58 and 59. Input terminals 60 and 61 are coupled to the base electrodes 53 and 56 through current limiting resistors 62 and 63, respectively. Switching transistor 50 has its collector electrode 54 connected to the common terminal 64 between series resistor 34 and 35 of the gain and bandwidth determining network 30. This enables the output potential at the collector electrode 54 of switching transistor 50 to properly bias the diodes 37 and 38 so that the gain and bandwidth determining network 30 will become operative when the magnetic tape is traveling at a low speed. Switching transistor 51 has its collector electrode 57 connected to the common terminal 65 between series resistors 40 and 41 of the gain and bandwidth determining network 31. The output potential at the collector electrode 57 of switching transistor 51 properly biases the diodes 43 and 44 so that the gain and bandwidth determining network 31 will become operative when the magnetic tape is traveling at a high speed. Thus, the electronic switching circuit comprised of transistors 50 and 51 and diodes 37, 38, 43 and 44 is used to select the appropriate gain and bandwidth network 30, 31 depending on the speed of the magnetic tape.

The output of stage 1 is coupled to the input of amplifying stage 2 through coupling capacitors 68 and 69. Stages 2 and 3 have identical components as stage 1, and provide additional amplification to amplified information. The switching transistors 50 and 51 used in stage 1 are also employed to select an appropriate gain and bandwidth determining network in each of the amplifying stages 2 and 3. The output of amplifier circuit is taken across output terminals 70 and 71 of stage 3.

In operation, assume that a magnetic tape (not shown) is going to be operated at a low speed during the playback mode of a magnetic tape recording and reproducing system. The gain and bandwidth of the two-speed playback amplifier circuit is adjusted for low-speed operation by applying a negative DC potential to the input terminal 60 of switching transistor 50 and a positive DC potential to the input terminal 61 of switching transistor 51. The negative DC potential biases switching transistor 50 into saturation, thereby causing the potential at the collector electrode 54 to drop to near 0 volts. This output potential at the collector electrode 54 of switching transistor 50 forward biases the switching diodes 37 and 38 into conduction, thereby causing the gain and bandwidth determining network 30 to become operative. The components, 33, 34, 35 and 36 of network 30 determine the gain and bandwidth of the amplifier 10, 11 at the low tape speed. The positive D.C. potential at the input terminal 61 biases switching transistor 51 to cut off, thereby causing the collector electrode 57 of transistor 51 to become equal to the negative potential of the power supply 20. This output potential at the collector electrode 57 of switching transistor 51 reverse biases the switching diodes 43 and 44. This prevents the gain and bandwidth determining network 31 from becoming operative at low tape speed.

The switching transistor 50 causes the low-speed gain and bandwidth determining network of amplifying stages 2 and 3 to become operative while the switching transistor 51 prevents the high-speed gain and bandwidth determining network of amplifying stages 2 and 3 from becoming operative. Information on the magnetic tape (not shown) is detected by a magnetic head (not shown) and appears at input terminals 27 and 28 of amplifying stage 1. The detected information is amplified by transistors 10 and 11 of stage 1 and then further amplified by stages 2 and 3. The amplified information appears across the output terminals 70 and 71 of stage 3. Thus, the gain and bandwidth of the two-speed playback amplifier circuit has been changed so that the amplifier will have an optimum signal-to-noise ratio at the low tape speed.

During high speed operation of the magnetic tape, the high-speed gain and bandwidth determining networks of each of the three stages 1, 2 and 3 become operative while the low speed gain and bandwidth determining networks become inoperative by reversing the D.C. potentials on the input terminals 60 and 61 of switching transistors 50 and 51. The operation of the two-speed playback amplifier circuit is similar at low and high tape speeds.

Thus, it is seen that the present invention provides a selectable gain and bandwidth amplifier circuit that utilizes a simple and inexpensive electronic switching circuit for selecting an appropriate gain and bandwidth determining network. Although the preferred embodiment of the present invention has employed two gain and bandwidth determining networks, it is appreciated that three or more gain and bandwidth determining networks may also be employed if additional switching transistors and diodes are used. It is also to be appreciated that PNP conductivity type transistors 10, 11, 50 and 51 may also be NPN conductivity type transistors by making corresponding changes in potential requirements.

Although the present invention has been shown and described in terms of a preferred embodiment, changes and modifications which do not depart from the inventive concepts taught herein will suggest themselves to those skilled in the art. Such changes and modifications are deemed to fall within the scope of the invention.

What is claimed is:

1. A selectable gain and bandwidth amplifier circuit comprising:

a pair of differential connected amplifying transistors, each of said transistors having an emitter electrode, a base electrode and a collector electrode;

a plurality of gain and bandwidth determining networks, a plurality of pairs of diodes respectively coupling said networks in cascade between the collector electrodes of said transistors, said diodes having like polarity terminals connected to said collectors; and a separate transistor coupled to each of said gain and bandwidth determining networks for selectively controlling the conductivity of said pair of diodes coupled thereto and selecting one of said gain and bandwidth determining networks.

2. A selectable gain and bandwidth amplifying circuit for use in a magnetic tape recording and playback system comprising:

a plurality of amplifying stages, each of said amplifying stages having a pair of differential connected amplifying transistors, a plurality of semiconductor switching diodes, and a plurality of gain determining networks;

each of said amplifying transistors having an emitter electrode, a base electrode and a collector electrode;

said switching diodes disposed in pairs with like polarity terminals coupled to the collector electrodes of the respective transistors;

each of said gain and bandwidth determining networks coupled between a pair of said diodes; and a switching transistor coupled to each of said gain and bandwidth determining networks in one of said amplifying stages, said switching transistors coupled to said gain and bandwidth determining networks in each of the remaining of said amplifying stages; and said switching transistors for selectively controlling the conductivity of said pairs of diodes and selecting one of said gain and bandwidth determining networks in each of said amplifying stages.

3. A selectable gain and bandwidth amplifier circuit comprising a pair of differential connected amplifying transistors, each of said transistors having an emitter electrode, a base electrode, and a collector electrode, a plurality of gain and bandwidth determining networks each including a pair of series connected resistors having a common junction therebetween, pairs of diodes respectively coupling said networks in cascade between the collector electrodes of said transistors, said diodes having like polarity terminals connected to said collector electrodes and opposite like polarity terminals connected to the ends of said resistors remote from said junctions, and a plurality of switching transistor means respectively coupled to said common junctures of said pairs of resistors for selectively applying first and second potentials thereto respectively in forward and reverse biasing relation to said diodes connected to said pairs of resistors.

References Cited by the Examiner

UNITED STATES PATENTS

| | | | |
|---|---|---|---|
| 2,557,888 | 6/51 | Olson | 330—145 X |
| 2,933,694 | 4/60 | Carter | 330—144 X |

| | | | |
|---|---|---|---|
| 3,032,704 | 5/62 | Beck | 330—29 X |
| 3,046,417 | 7/62 | Garcia | 330—29 X |

OTHER REFERENCES

Army Technical Manual, TM 11–690, March 1959, U.S. Government Printing Office, chapt. 11, page 191 relied on.

ROY LAKE, *Primary Examiner.*

NATHAN KAUFMAN, *Examiner.*